ard G. Tinger, Pittsford; Edward

United States Patent
Tinger et al.

[15] 3,694,524
[45] Sept. 26, 1972

[54] BLENDS OF LOW DENSITY POLYETHYLENE AND BUTENE/ETHYLENE COPOLYMERS AND HIGH TEAR STRENGTH BLOWN FILM MADE THEREFROM

[72] Inventors: Harold G. Tinger, Pittsford; Edward A. Colombo, Brooklyn, both of N.Y.

[73] Assignee: Mobil Oil Corporation

[22] Filed: May 7, 1971

[21] Appl. No.: 141,381

[52] U.S. Cl. ............260/897 A, 260/897 B, 264/209
[51] Int. Cl. .............................................C08f 29/12
[58] Field of Search ......................260/897 A, 897 B

[56] References Cited

UNITED STATES PATENTS 3,050,497   8/1962   Young......................260/878

FOREIGN PATENTS OR APPLICATIONS 775,184   1/1968   Canada

Primary Examiner—Murray Tillman
Assistant Examiner—C. J. Seccuro
Attorney—Oswald G. Hayes, Andrew L. Gaboriault and Mitchell G. Condos

[57] ABSTRACT

By incorporating low density polyethylene (e.g., above 5 to about 15 weight percent) into a butene-1/ethylene copolymer containing from about 0.25 to about 3 mole percent ethylene, a resin blend is provided that is extrudable at substantially high extrusion rates to a blown tubular film of substantially high tear strength.

8 Claims, No Drawings

BLENDS OF LOW DENSITY POLYETHYLENE AND BUTENE/ETHYLENE COPOLYMERS AND HIGH TEAR STRENGTH BLOWN FILM MADE THEREFROM

CROSS-REFERENCES TO RELATED APPLICATIONS

Copending U.S. application, Ser. No. 809,049 filed March 20, 1969, now U.S. Pat. No. 3,634,551 relates to heat sealable blends of 95–99 percent polybutene and 1–5 percent low density polyethylene, by weight.

BACKGROUND OF THE INVENTION

1. Field of the Invention

This invention is directed to blends of low density polyethylene with a copolymer of butene-1/ethylene containing a small amount (e.g., 0.25 to 3 mole percent) of ethylene and blown tubular film, produced from such blends, of high tear strength properties.

2. Description of the Prior Art

Great Britain, Pat. specification No. 1,150,637 relates to a process for copolymerizing butene-1 in presence of 0.01 to 0.7 mol percent ethylene, based on the butene-1, to provide resins fabricatable into articles (film) of improved tear (and other properties) as compared to such articles fabricated from butene-1 homopolymer.

SUMMARY OF THE INVENTION

This invention provides blends comprising more than 5 and up to about 15, preferably 6 to 12, weight percent low density polyethylene and about 85 up to less than 95 weight percent of butene-1/ethylene copolymer containing from about 0.25 to about 3, preferably 0.8 to 1.2, mole percent ethylene; and blown film, extruded from such a blend, of high tear strength. As compared to resins consisting essentially of butene-1 homopolymer, or butene-1/ethylene copolymers, the resin blends of this invention enable production of blown tubular film at substantially higher tubular extrusion rates without substantially sacrificing, but generally substantially improving, the tear strength characteristics of the resulting film at high extrusion rates, e.g., above a take-off speed of 25 feet/minute. Such film is, therefore, useful for production of plastic products, such as bags and other packaging materials wherein high tear strength of the film that is used is highly desired.

DESCRIPTION OF SPECIFIC EMBODIMENTS

Throughout the specification and claims, the term "low density polyethylene" relates to polyethylene that has a density up to about 0.93 and, preferably, about 0.91 to about 0.92 gram/cm³. Such materials include commercially available solid polyethylene resins producible by the well-known high pressure process, utilizing free radical initiators, more specific examples of which have a density in the range of about 0.910 to about 0.925 and, as a specific embodiment, a density of 0.923 and a Melt Index of 1.4. Also useful, and within the scope of such a definition for low density polyethylene, are copolymers of ethylene with another vinyl monomer (e.g., vinyl acetate, other alpha olefins) in minor concentration providing copolymers having a density in the aforesaid ranges.

The butene-1/ethylene copolymers useful for practice of this invention are such copolymers containing from about 0.25 to about 3 and, preferably, about 0.8 to about 1.2. mole percent ethylene. In more specific aspect, copolymers embodied for use herein may have a melt index preferably in the range of about 1 to about 10, more preferably from about 1.5 to about 2.5; a tensile yield strength of, for example, from about 1600 to 2400 psi, and preferably 1600 to 2100; and preferably a density in the range of 0.905 to about 0.920. Based on analysis of crystalline morphology, the copolymers contain lengthy sequences of butene-1 units in isotactic configuration followed by random or shorter methylene sequences. Such copolymers may be produced by copolymerizing butene-1 and ethylene in presence of stereo-specific polymerization catalyst. For example, such copolymers may be made by reacting an appropriate mixture of butene-1 and ethylene in the presence of suitable catalysts, such as titanium trichloride with an aluminum compound, typical of which are alkyl aluminum halides such as diethylaluminum chloride. A particularly feasible process for preparing them is described in U. S. Pat. No. 3,629,940 which discloses, for example, liquid phase copolymerization of mixtures of butene-1 and ethylene to produce ethylene-butene copolymers utilizing a catalyst system comprising (A) a compound of a transitional metal of Groups IV-A, V-A, VI-A and VII of the Periodic Arrangement of the Elements wherein the metal is present in a valence state lower than its maximum, and (B) at least one organometallic compound of metals of Groups II and III of the Periodic Arrangement of the Elements. A particularly suitable catalyst comprises diethylaluminum chloride, diethylaluminum iodide and $TiCl_3$, as set forth in U.S. Pat. No. 3,629,940, for liquid phase polymerization of a mixture of ethylene and butene to form a relatively high isotactic copolymer. Such a method was used in preparation of the butene-1/ethylene copolymers for which data are set forth in the illustrative examples herein.

Non-limiting examples of butene-1/ethylene copolymers embodied for practice of this invention include the following:

| | Butene-1/Ethylene Copolymer Containing 0.75 mole% Ethylene | Butene-1/Ethylene Copolymer Containing 1.5 mole% Ethylene |
| --- | --- | --- |
| Tensile Modulus(psi)[1] | 34,600 | 36,100 |
| Yield Strength(psi)[2] | 2,140 | 2,080 |
| Break Strength(psi)[3] | 4,740 | 4,630 |
| Elongation(%)[4] | 435 | 386 |
| Melt Index (g./10 minutes)[5] | 1.70 | 1.85 |
| Density (g./cm³)[6] | 0.908 | 0.908 |

Notes: 1 = ASTM D—638 (Type IV bar at 12 inches/minute).
2 = ASTM D—638 at 20 inches/minute.
3 = ASTM D—638 at 20 inches/minute.
4 = ASTM D—638 at 20 inches/minute.
5 = ASTM D—1238, Condition E.
6 = ASTM D—1505.

As aforesaid, the resin blends of this invention comprise from more than 5 and up to about 15, and preferably about 6 to about 12, weight percent of the low density polyethylene and from 85 to 94, weight percent of butene-1/ethylene copolymer containing about 0.25 to about 3, preferably about 0.8 to about 1.2, mole percent ethylene. Use of blends of such materials and such concentrations of the blend components provide, in general, resin blends extrudable by blown film extrusion methods, to blown tubular film of substantially high tear strength even though the extrusion may be carried out at high extrusion rate while at least maintaining, or not sacrificing to undesired extent, other desirable properties of the resulting blown film. Thus, practice of this invention provides means (i.e., incorporation of the low density polyethylene) for substantially increasing the rate of extrudability of blown tubular film from a butene-1/ethylene copolymer of low ethylene content while substantially retaining the desirable properties of the butene-1/ethylene copolymer based film, and in particular, its tear strength characteristics. Expressed otherwise, and as compared to blown tubular film extrusion of such butene-1/ethylene copolymers practice of this invention, by use of low density polyethylene generally obviates or minimizes the tendency of the copolymer itself to provide bubble instability upon such extrusion at relatively high extrusion rates. Generally speaking, use in blends of the type involved herein of a butene-1/ethylene copolymer containing less than 0.25 mole percent ethylene generally results in processing difficulties (i.e., in processing by the blown tubular film technique), as also does use of less than about 5 weight percent of the low density polyethylene in the blend. As to the concentration of the low density polyethylene in the blend, a concentration in excess of about 15 weight percent in the blend generally and undesirably decreases the tensile strength of the resulting blown tubular film.

In the use of the blends embodied herein for production of blown tubular film, and prior to extrusion, the components of the desired blend are blended together to form a substantially homogeneous resin mixture. This may be accomplished, for example, by masticating the components on a slightly warm, differential speed, 2-roll mill or in a similar polymer blending machine, such as a Banbury mill. The film is then extruded into a film using a standard tubular extruder. Additives, such as fillers, anti-oxidants, pigments, anti-static agents, and the like may be incorporated in the blend during or after the blending operation.

The following examples set forth illustrative embodiments of the present invention without intent that the invention be limited thereto.

For the following, the data set forth were obtained by use of dry blended resin, as specified for each example, for production of blown tubular film using a standard blown film extruder under the following conditions at a take-off speed as noted:

Extruder die diameter = 6 inches
Films size produced = 1.5 mil × 26 inch lay flat
Die gap = 15 mil
Melt temperature = 370°–380° F.
Extruder screw speed = 140 RPM.

EXAMPLE

|  | Blend 1: Butene-1 homopolymer | Blend 2: Butene-1/ethylene copolymer |
|---|---|---|
| Properties of resin blend: | | |
| Mol percent of ethylene in copolymer | 0 | About 1.0 |
| Weight percent of low density polyethylene in blend | 5 | 10 |
| Density, g./cm.³ (ASTM D-1505) | 0.913 | 0.908 |
| Tensile modulus, p.s.i. (ASTM D-638 Type IV bar at 12 inches per minute) | 35,300 | 37,500 |
| Yield strength, p.s.i. ASTM D-638 at 20"/min | 2,150 | 1,970 |
| Break strength, p.s.i. ASTM D-638 at 20"/min | 4,130 | 3,700 |
| Elongation, percent ASTM D-638 at 20"/min | 362 | 368 |
| Melt index, g./10 min. (ASTM D-1238, condition E) | 1.90 | 2.05 |
| Properties of film fabricated from the resin blends (film produced at take-off speed of 15.8 ft./min.): | | |
| Tensile modulus, p.s.i. (ASTM D-638, Type IV bar at 12 in./minute) | MD 37,600 / TD 40,700 | 36,400 / 34,700 |
| Yield strength, p.s.i. (ASTM D-638 at 20 in./min.) | MD 2,540 / TD 2,570 | 2,280 / 2,170 |
| Break strength, p.s.i. (ASTM D-638 at 20 in./min.) | MD 4,610 / TD 4,850 | 3,490 / 3,730 |
| Elongation, percent (ASTM D-638 at 20 in./min.) | MD 201 / TD 167 | 184 / 187 |
| Dart drop, gms. (ASTM D-1709-A.) | 350 | 221 |
| Tear strength (film produced at take-off speed of 15.8 ft./min.): | | |
| At 1,800 in./min | MD 1,050 g./mil / TD 880 g./mil | 1,000 g./mil / 900 g./mil |
| At 5,040 in./min | MD — / TD — | 1,200 g./mil / 1,000 g./mil |
| At 9,000 in./min | MD 470 g./min / TD 640 g./mil | 1,000 g./mil / 1,000 g. mil |
| At 13,200 in./min | MD 205 g. mil / TD 740 g./mil | 800 g./mil / 1,200 g./mil |
| At 15,120 in./min | MD 60 g./mil / TD 680 g./mil | 360 g./mil / 1,200 g. mil |
| Tear Strength (film produced at take off speed of 30 ft./min.) at 10,200 in./min | MD 65 g./mil / TD 32 g./mil | 840 g./mil / 720 g./mil |

The low density polyethylene used for the blends in the following tabulation had a density of 0.923 and a melt index of 1.4. The tabulation includes, for comparison purposes, Blend 1 that comprised a blend of butene-1 homopolymer with the low density polyethylene. The butene-1/ethylene copolymer, used for preparing the blends in the following tabulation had a melt index of 1.7, a density of about 0.908, an ethylene content of one mole percent, as determined by melting point of the polybutene Form II polymorph by Differential Scanning Colorimeter (DSC) and a yield strength (psi) of 2,140 (ASTM D—638 at 20 inches/minute). The data set forth for the properties of the film are based on the designated tests being carried out with the film having been kept at room temperature for 10 days prior to testing.

For the foregoing, data set forth for Tear Strength was obtained by use of the following procedure:

Tear strength of the film samples was measured with a Plastechon Model 581 Universal Tester (available from Plastech Equipment Corp., Natick, Mass.). In this test a film sample is prepared to resemble a pair of "trousers." Each leg of the trouser test sample is placed in the jaws of the Plastechon Model 581. The jaws are then made to move apart from each other at a preset rate (inches/minute), i.e., the "inches/minute" set forth under "Tear Strength" in the foregoing tabulation. The resulting stress-strain plot is recorded on an oscilloscope. From the stress-strain plot the maximum force observed is determined and divided by the sample thickness to give the tear strength of the specimen in grams/mill.

As shown by the foregoing data, the blown tubular film produced at a low take-off speed of 15.8 ft./minute provided, from both Blend 1 and Blend 2, film of suitable properties in regard to tensile modulus, yield strength, break strength, elongation and dart drop. As to tear strength, film produced at that low take-off rate from Blend 1 (comparative) decreased substantially at relatively high preset rates for the Tear Strength values shown, as compared to corresponding values shown for the film produced from Blend 2, i.e., from a resin blend embodied by the present invention. The improvement provided by practice of this invention is markedly evident from the Tear Strength values shown for the film (produced from Blend 2) when the film was produced at a substantially higher take-off rate (i.e., 30 feet/minute). As shown, at such a higher take-off rate, a substantially high tear strength was still possessed by the Blend 2 film, whereas the film produced at the same rate from comparative Blend 1 possessed exceedingly low tear strength characteristics.

In regard to the blends for which data is set forth in the foregoing tabulation, it should be noted that comparative Blend 1 comprised of blend of 5 weight percent of the low density polyethylene in the butene-1 homopolymer whereas Blend 2 comprised 10 weight percent of the low density polyethylene. For comparative Blend 1, the concentration of the low density polyethylene was limited to 5 weight percent to avoid incompatibility that generally occurs when higher than about 5 weight percent concentrations are used with the butene-1 homopolymer, whereas, as another advantage provided by the present invention, substantially higher concentrations of the low density polyethylene are useful without encountering incompatibility, in blends with a butene-1/ethylene copolymer as embodied for use herein. In example thereof is the 10 weight percent concentration of the low density polyethylene in the butene-1/ethylene copolymer of Blend 2.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

We claim:

1. A resin blend comprising, in weight percent, (1) from more than 5 to about 15 low density polyethylene having a density of up to about 0.93 and (2) from about 85 to less than 95 of a butene-1/ethylene copolymer containing from about 0.25 to about 3 mole percent ethylene said copolymer containing sequences of butene -1 units in isatactic configuration and prepared by copolymerizing butene-1 and ethylene in the presence of stereo-specific polymerization catalyst.

2. A blend, as defined in claim 1, wherein the concentration of the low density polyethylene is from about 6 to about 12, and the ethylene content of the copolymer is from about 0.8 to 1.2 mole percent.

3. A blend, as defined in claim 1, wherein the low density polyethylene has a density of at least 0.92 but less than 0.93, the concentration of the low density polyethylene in the blend is about 10 weight percent, and the butene-1/ethylene copolymer contains about 1 mole percent ethylene.

4. A blown tubular film of the resin blend defined in claim 1.

5. A blown tubular film of the resin blend of claim 2.

6. A blown tubular film of the resin blend of claim 3.

7. A PROCESS FOR PRODUCING FILM BY BLOWN TUBULAR FILM EXTRUSION AT A SUBSTANTIALLY HIGH TAKE-off rate which comprises subjecting to blown tubular film extrusion a resin blend as defined in claim 1.

8. A process, as defined in claim 7, wherein the low density polyethylene has a density of at least 0.92 but less than 0.93, the concentration of the low density polyethylene in the blend is about 10 weight percent, and the butene-1/ethylene copolymer contains about one mole percent ethylene.

* * * * *